US 8,205,202 B1

(12) United States Patent
Leonard

(10) Patent No.: US 8,205,202 B1
(45) Date of Patent: Jun. 19, 2012

(54) MANAGEMENT OF PROCESSING THREADS

(75) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1095 days.

(21) Appl. No.: 12/061,871

(22) Filed: Apr. 3, 2008

(51) Int. Cl.
*G06F 9/46* (2006.01)

(52) U.S. Cl. ........ 718/102; 718/100; 718/101; 718/104; 718/105

(58) Field of Classification Search .................. 718/100, 718/101, 102, 104, 106, 105
See application file for complete search history.

(56) References Cited

U.S. PATENT DOCUMENTS

| | | | | |
|---|---|---|---|---|
| 6,430,616 | B1 * | 8/2002 | Brinnand et al. | 709/224 |
| 6,886,041 | B2 * | 4/2005 | Messinger et al. | 709/226 |
| 7,140,025 | B1 * | 11/2006 | Dillow et al. | 719/313 |
| 7,360,215 | B2 * | 4/2008 | Kraiss et al. | 718/100 |
| 2003/0069917 | A1 * | 4/2003 | Miller | 709/105 |
| 2004/0098364 | A1 * | 5/2004 | Liukkonen et al. | 707/1 |
| 2005/0091276 | A1 * | 4/2005 | Brunswig et al. | 707/104.1 |
| 2006/0072563 | A1 * | 4/2006 | Regnier et al. | 370/389 |
| 2006/0107261 | A1 * | 5/2006 | Vedula | 718/100 |
| 2008/0295107 | A1 * | 11/2008 | Muscarella | 718/104 |
| 2009/0037912 | A1 * | 2/2009 | Stoitsev et al. | 718/100 |

* cited by examiner

*Primary Examiner* — Emerson Puente
*Assistant Examiner* — Willy W Huaracha

(57) ABSTRACT

A computer system that comprises computers, front-end applications, a messaging service, and an enterprise integration application is disclosed, each of the applications and the messaging service executing on at least one of the computers. The messaging service places service requests transmitted from the front-end applications on queues based on the type of the service requests. The enterprise integration application comprises business logic modules, each business logic module dedicated to acting on one type of the service requests and comprising at least one interface thread, at least one handling thread, and at least one management thread. The interface threads retrieve service requests from the queue associated with the type of service request associated with the business logic module. The handling threads act on the service requests retrieved by the interface thread. The management thread creates additional interface threads and handling threads as more are needed by the business logic module.

19 Claims, 4 Drawing Sheets

MANAGEMENT OF PROCESSING THREADS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large enterprises may develop and maintain large computer systems to promote their business activities. For example, a large telecommunications service provider enterprise may have large computer systems to accumulate customer usage records, to manage their telecommunications network equipment, to coordinate sales activities, to generate accurate and timely customer bills, and other. In some circumstances these computer systems develop over time and comprise different technologies, different third party components, and different interfaces.

Employees and/or customers may interact with front-end applications that depend upon data stored in back-end systems. An intermediate layer of computer applications and/or systems may be provided that mediates between the front-end applications and the back-end systems. To provide timely and efficient front-end response in such a large computer system, the intermediate layer of computer applications and/or systems needs to be designed to be efficient and scalable in order to grow gracefully as the enterprise grows and/or changes.

SUMMARY

In an embodiment, a computer system is provided. The computer system comprises computers, front-end applications, a messaging service, and an enterprise integration application, each of the applications and the messaging service executing on at least one of the computers. The front-end applications transmit service requests to the messaging service. The messaging service places the service requests on queues based on the type of the service requests. The enterprise integration application comprises business logic modules, each business logic module dedicated to acting on one type of the service requests. Each business logic module comprises at least one interface thread, at least one handling thread, and at least one management thread. The interface threads retrieve service requests from the queue associated with the type of service request associated with the business logic module. The handling threads act on the service requests retrieved from the queue by the interface thread. The management thread creates additional interface threads as more interface threads are needed by the business logic module and creates additional handling threads as more handling threads are needed. The management thread manages the number of handling threads to equal the number of service requests that are in-progress and manages the relationship between the number of handling threads and the number of interface threads so that the number of handling threads is greater than the number of interface threads.

In another embodiment, a method for managing a computer system service request is also provided. The method comprises initializing a business logic module, the business logic module to act upon service requests and initially comprising an at least one interface thread and an at least one handling thread. The method also comprises monitoring a plurality of statistics associated with the at least one interface thread and the at least one handling thread. The method further comprises one of the at least one interface threads retrieving a computer system service request from a messaging service, one of the at least one handling threads acting on the computer system service request retrieved by the at least one interface thread from the messaging service, and controlling the numbers of interface threads and handling threads based on monitoring the statistics.

In another embodiment, a system for executing a computer service request is also provided. The system comprises a computer system, an at least one handling thread, an at least one interface thread, a statistics thread, and a management thread. The at least one handling thread processes a plurality of service requests, at least in part, by communicating with back-end computer systems. The at least one interface thread receives the service requests from front-end applications and provides them asynchronously to the at least one handling thread. The statistics thread tracks the utilization of the at least one interface thread and the at least one handling thread. The management thread creates and destroys interface threads and handling threads based on the utilization of the at least one interface thread and the at least one handling thread. The at least one handling thread, the at least one interface thread, the statistics thread, and the management thread execute on the computer system. The at least one handling thread, the at least one interface thread, the statistics thread, and the management thread are associated with a business logic module that is dedicated to processing service requests of one type of a plurality of types of service request.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
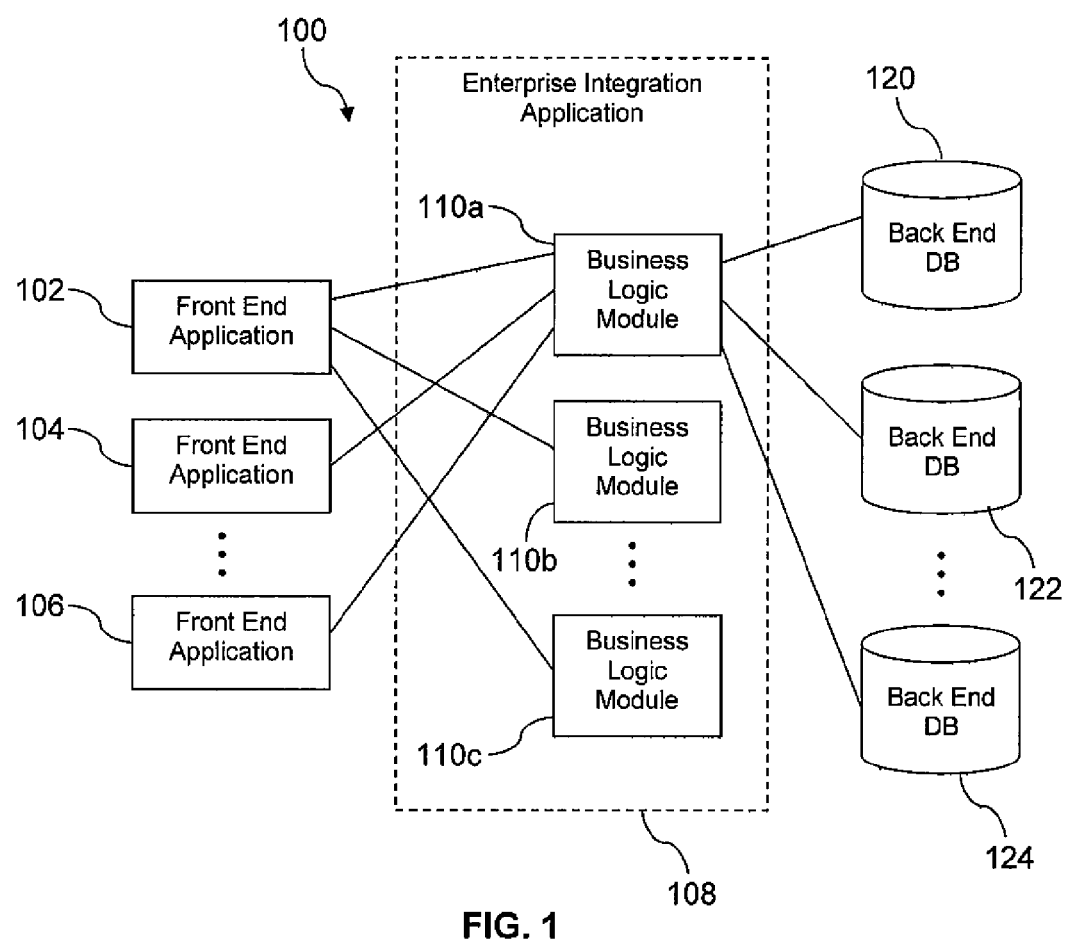
FIG. 1 illustrates an enterprise computing system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An architecture and a method for implementing an enterprise integration are disclosed. The enterprise integration may be understood to be a processing layer between a plurality of front-end applications used by customers and/or employees of an enterprise and a plurality of back-end applications and/or back-end systems. The enterprise integration layer receives service requests from the front-end applications, mediates these service requests to actions in the back-end systems, and returns the appropriate results to the front-end applications. For example, the enterprise integration layer may mediate a service request from a front-end application to "GetAccount(subscriber_name)" to an access to a back-end customer accounts data base and return the customer account information to the requesting front-end application in an appropriate structure or format for use by the front-end application. In an embodiment, every different type of service request that the front-end applications may direct to the enterprise layer application is associated with a particular business logic module. Each business logic module is responsible for handling all service requests from front-end applications for the specific type of service request associated with the subject business logic module, for example "GetAccount( )" In a large enterprise, the volume of calls from the front-end applications for services may be very substantial.

A novel architecture and method of providing the services of the enterprise integration layer using the business logic modules is provided. Each business logic module is constructed according to a unified architectural design. In an embodiment, each business logic module includes one or two management threads, at least one interface thread, and at least one handling thread. This structure promotes the decoupling of the number of interface threads from the number of handling threads. In an embodiment, it has been found that the overhead of initializing an interface thread may be relatively high compared to the amount of useful work performed by the interface thread. By decoupling the number of interface threads from the number of handling threads the processing time wasted in overhead activities initializing the interface threads may be reduced, thereby more effectively utilizing processing resources and reducing equipment costs. For example, in an embodiment, a business logic module may comprise one or two management threads, two interface threads, and ten handling threads. The two interface threads may be sufficient to serve the ten handling theads, and this may significantly reduce interface thread initialization overhead.

The business logic module management threads are directed to creating and destroying interface threads and handling threads to maintain an appropriate processing balance, for example to maintain a sufficient number of interface threads to support the needs of the number of handling threads but not an excess number of interface threads that would entail unnecessary initialization overhead. In an embodiment, the business logic modules comprise a statistics management thread to collect processing statistics of the interface threads and of the handling threads and a population management thread that manages the number of interface threads and handling threads based on the statistics collected by the statistics management thread to maintain the desired balance between interface threads and handling threads. In an embodiment, the population management thread and/or the statistics management thread may receive requests from another module, for example a capacity governing module, to either increase or decrease service request handling capacity.

Turning now to FIG. 1, a system 100 for providing enterprise computing services according to an embodiment of the disclosure is described. The system 100 may be implemented on any number of general purpose computer systems. General purpose computer systems are described in greater detail hereinafter. The system 100 comprises a plurality of front end applications, for example a first front end application 102, a second front end application 104, and a third front end application 106. The system 100 also comprises an enterprise integration application 108. In some contexts the enterprise integration application 108 may be referred to as an inter-domain information broker. The system 100 also comprises a plurality of back end databases, for example a first back end database 120, a second back end database 122, and a third back end database 124. In an embodiment, the system 100 may also comprise one or more back end computer systems and/or computer systems (not shown). In an embodiment, the system 100 may comprise any number of front end applications 102, 104, 106 and any number of back end databases 120, 122, 124. The front end applications 102, 104, 106 may provide functionality used by employees of an enterprise or by customers of an enterprise, for example a provisioning front end application to open a new telecommunications service account for a customer, a network management front end application to monitor the operating condition of a telecommunications network, and other functionality. In an embodiment, front end applications may include customer care applications, sales applications, customer payment applications, web interface applications, and others. The enterprise integration application 108 may mediate service requests from the front end applications 102, 104, 106 to one or more requests for services to the back end databases 120, 122, 124, for example read accesses, write accesses, delete accesses, and others. In an embodiment, the back end databases 120, 122, 124 may be associated with billing systems, provisioning systems, network management systems, number portability systems, and others.

In an embodiment, the enterprise integration application 108 may be composed of a plurality of business logic modules 110, for example a first business logic module 110a, a second business logic module 110b, and a third business logic module 110c. In an embodiment, the enterprise integration application 108 may be composed of a large number of business logic modules 110, for example between about 400 and 500 business logic modules. In other embodiments, however, the enterprise integration application 108 may be comprised of other numbers of business logic modules 110. In an embodiment, each one of the business logic modules 110 is dedicated to processing one specific type of transaction and/or type of service request. Herein the terms type of service request and type of transaction mean substantially the same thing. Each service request from one of the front end applications 102, 104, 106 for a specific type of transaction is directed to the one of the business logic modules 110 that is dedicated to processing that type of service request or transaction. For example, a first type of service request or transaction request may be sent to the first business logic module 110a, a second type of service request may be sent to the second business logic module 110b, a third type of service request may be sent to the third business logic module 110c, and similarly other types of service request may be sent to other business logic modules 110.

The business logic modules 110 share a common architectural structure but differ in the detailed processing associated with the different transactions each business logic module 110 performs. The business logic modules 110 may communicate with the back end databases 120, 122, 124 using a variety of interfaces including common object request broker architecture (CORBA) interfacing methods, message queue, database manager, java messaging service, and others. In some contexts, the common object request broker architecture interfacing methods may be referred to as an object-based remote procedure call system.

Figure 2:
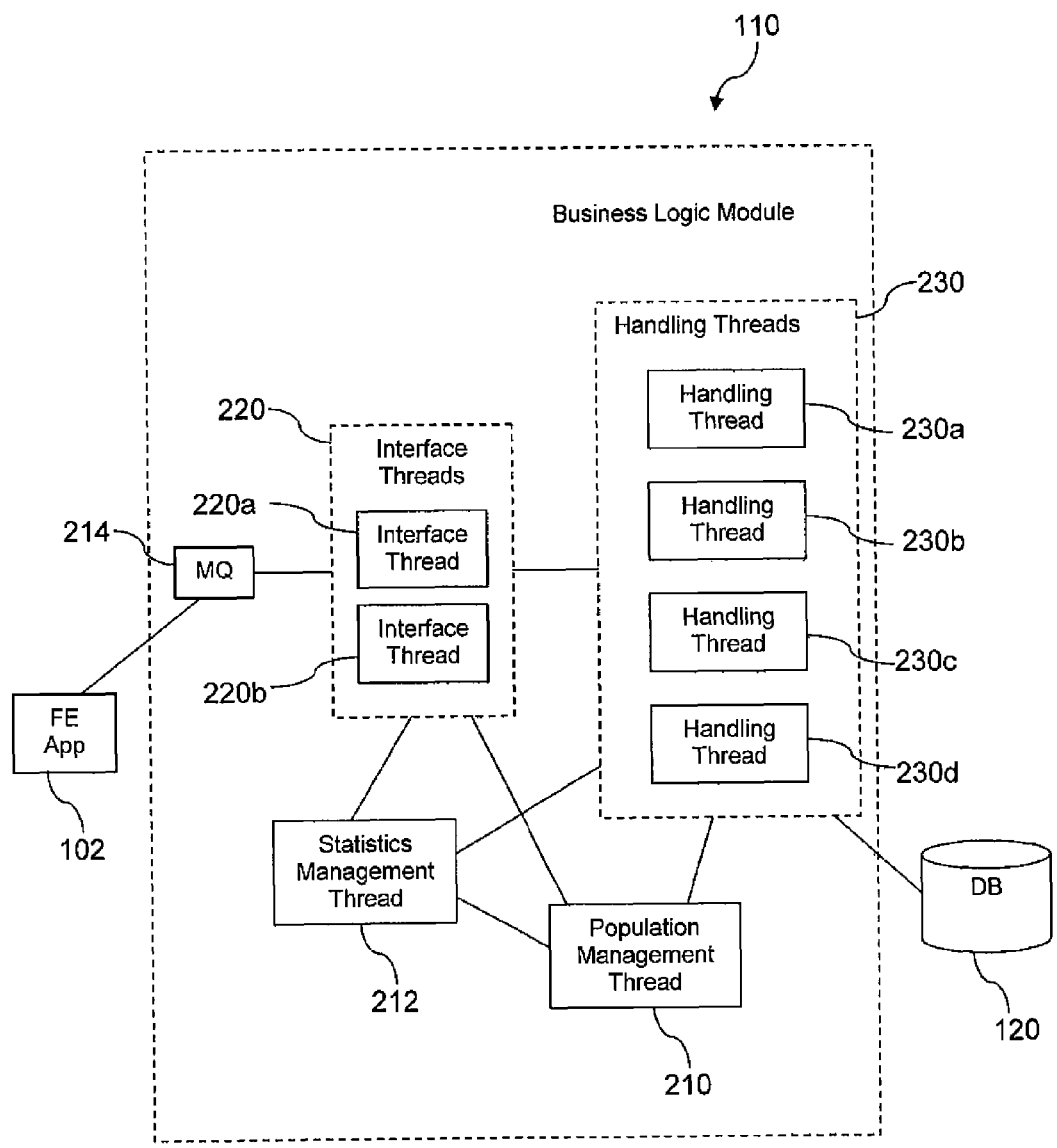
FIG. 2 illustrates a business logic module including management of threads according to an embodiment of the disclosure.

Turning now to FIG. 2, an illustration of the business logic module 110 is discussed. The business logic module 110 comprises a population management thread 210, a statistics management thread 212, a message queue 214, one or more interface threads 220, and one or more handling threads 230. As is well known to those skilled in the computer systems art, processes and threads provide substantially independent streams of computer control. By running portions of the instructions associated with different processes and threads on the same computer system, the processes and threads may appear to execute concurrently on the computer system. Processes and threads are typically distinguished by the threads having less context and overhead than processes. In some contexts, threads may be referred to as light weight processes. Under one operating condition the business logic module 110 may comprise, for example, a first interface thread 220a and a second interface thread 220b. Under one operating condition the business logic module 110 may comprise, for example, a first handling thread 230a, a second handling thread 230b, a third handling thread 230c, and a fourth handling thread 230d. Under other operating conditions, the business logic module 110 may comprise either more or fewer interface threads 220 and either more or fewer handling threads 230.

The number of interface threads 220 and the number of handling threads 230 comprising the business logic module 110 is contemplated to change with the operating conditions experienced by the business logic module 110. For example, the number of interface threads 220 and the number of handling threads 230 comprising the business logic module 110 may change depending on service request load placed on the business logic module 110 by the front end applications 102, 104, 106. In some contexts, the message queue 214 may be described or analyzed as outside of the structure of the business logic module 110. In an embodiment, the handling threads 230 preferably have about a one-to-one ratio with the service requests and/or the transaction requests. In an embodiment, the interface threads ideally have about a one-to-one ratio with the message queues and preferably have a less than about a one-to-one ratio with the handling threads and/or the service requests and/or the transaction requests.

The message queue 214 receives and stores service requests from the front end applications 102, 104, 106, for example from the first front end application 102. In an embodiment, the message queue 214 is a WebSphere message queue. The interface threads 220 remove the service requests from the message queue 214 and provide the service requests to the handling threads 230, one service request to one of the handling threads 230. The handling threads 230 provide specific processing for handling the specific transaction type associated with the business logic module 110 and interwork with the back end databases 120, 122, 124, for example the first back end database 120, as needed to take action on the service request. The handling threads 230 provide any results associated with the service requests to the interface threads 220. The interface threads 220 return the results to the front end applications, for example the first front end application 102, via the message queue 214. In another embodiment, however, the interface threads 220 may return the results directly to the appropriate front end application 102, 104, 106, bypassing the message queue 214. The interface threads 220 and the handling threads 230 perform their separate functions asynchronously. For example, when the first interface thread 220a has distributed a service request to the second handling thread 230b, the first interface thread 220a continues about its business without waiting for the second handling thread 230b to complete processing the service request.

The population management thread 210 spawns additional interface threads 220 and additional handling threads 230 as they are determined to be needed to support the processing load placed upon the business logic module 110 by the front end applications 102, 104, 106. The population management thread 210 also retires or destroys interface threads 220 and handling threads 230 as they are determined to be unnecessary to keep up with the processing load. In some contexts, the population management thread 210 may be referred to as a creator thread. In an embodiment, part of the process of spawning an additional interface thread 220 includes overhead for initializing a connection between the interface thread 220 and the message queue 214. For example, when initialized the interface thread 220 may connect to the message queue 214 and then open the message queue 214. In some circumstances, this initialization function may present a relatively substantial processing burden, when factored across the large numbers of business logic modules 110 that may be executing in the enterprise integration application 108. By decoupling the population of interface threads 220 from the population of handling threads 230, the business logic module 210 may reduce the overhead associated with establishing connections to the message queue 214. In an embodiment, the system 100 experiences a very heavy processing load and is implemented on a large number of computer systems. The savings in processing overhead realized by decoupling the number of interface threads 220 from the number of handling threads 230 may promote reduced capital equipment costs associated with purchasing server computer equipment to mount the enterprise integration application 108 and/or the several business logic modules 110. This cost savings may also be extended to reduced software licensing costs.

In an embodiment, the population management thread 210 may receive a control input requesting increased or decreased capacity support. For example, the population management thread 210 may receive a control input requesting 40% increased capacity support or 40% decreased capacity support. In this case, the population management thread 210 may proportionally increase or decrease, as appropriate, the numbers of handling threads 230. The population management thread 210 may also increase or decrease the numbers of interface threads 220 in response to the control input, but the increase or decrease of numbers of interface threads 220 may not be proportional to the increase or decrease of handling threads 230.

In an embodiment, the population management thread 210 may spawn a configurable number of interface threads 220 and handling threads 230 on initialization of the business logic module 110. For example, the population management thread 210 associated with the first business logic module 110a may initially spawn one interface thread 220 and one handling thread 230 when the first business logic module 110a is initialized. As another example, the population management thread 210 associated with the second business logic module 110b may initially spawn one interface thread 220 and six handling threads 230 when the second business logic module 110b is initialized. In an embodiment, the initial number of interface threads 220 and the handling threads 230 spawned by the population management thread 210 may range from 1 to 6. As the business logic module 110 continues to execute, the population management thread 210 dynamically adjusts the numbers of interface threads 220 and handling threads 230 to promote timely response to service requests received from the front end applications 102, 104, 106.

The statistics management thread 212 monitors the activity of the interface threads 220 and of the handling threads 230. The statistics management thread 212 shares current thread statistics with the population management thread 210, and the population management thread 210 controls the population of interface threads 220 and the population of handling threads 230 based on the current thread statistics to maintain an appropriate balance between the population of interface threads 220 and the population of handling threads 230. The statistics management thread 212 may monitor and track counts of activity of the interface threads 220 and of the handling threads 230. In some contexts, the statistics management thread 212 may be referred to as a counting thread. The statistics management thread 212 may monitor time and date stamps associated with the activities of the interface threads 220 and the handling threads 230. In some enterprises, the daily flux of business activities may be associated with a daily flux in the population of interface threads 220 and the population of handling threads 230. In some contexts, this may be referred to as a diurnal loading cycle. In some embodiments, the diurnal loading cycle may be associated with a varying proportion or ratio of interface threads 220 versus handling threads 230 over the cycle of a day. In an embodiment, the function of the population management thread 210 and the statistics management thread 212 may be combined in a single management thread.

Figure 3:
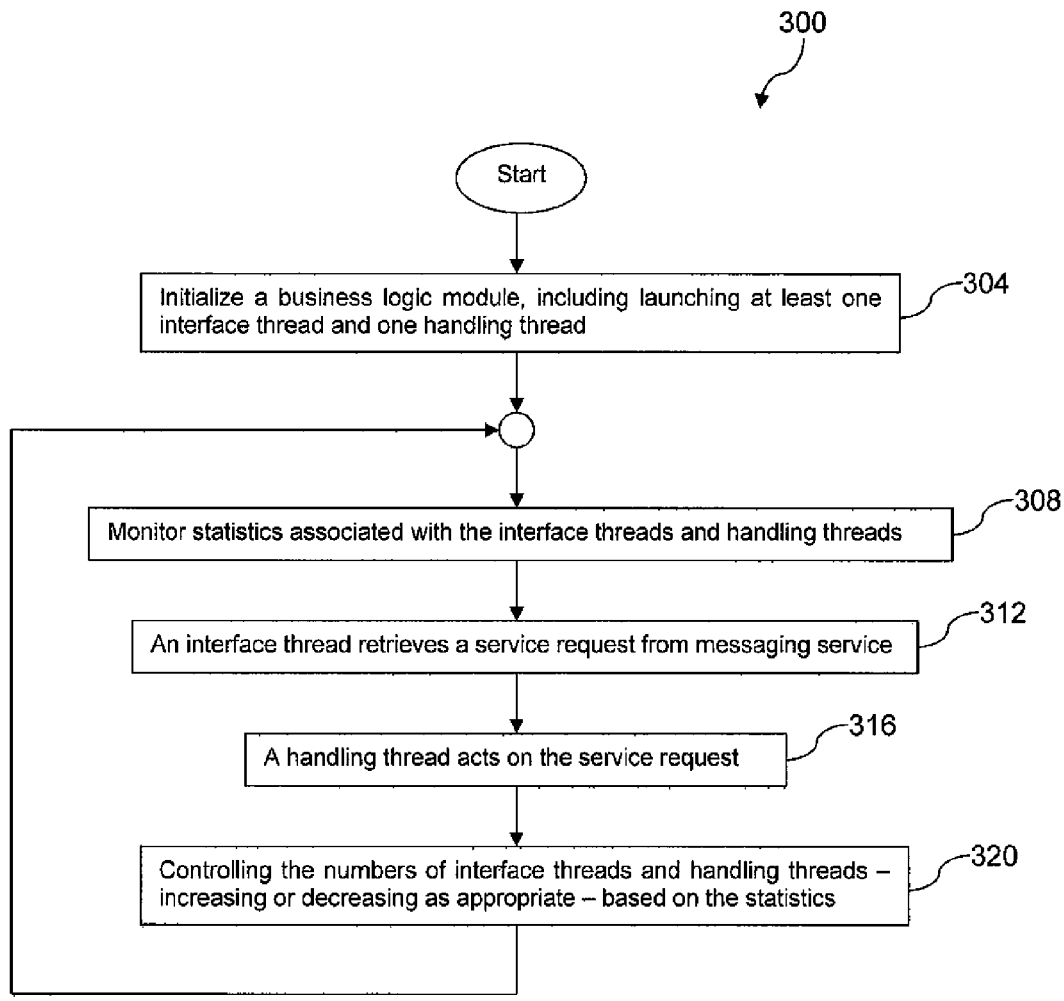
FIG. 3 illustrates a method of managing threads according to an embodiment of the disclosure.

Turning now to FIG. 3, a method 300 for managing processing threads is discussed. The method 300 begins at block 304, where the business logic module 110 is initialized. Initializing the business logic module 110 includes launching the population management thread 210 and the statistics management thread 212. As part of the initialization procedure, the population management thread 210 spawns at least one interface thread 220 and at least one handling thread 230. In an embodiment, the number of interface threads 220 and the number of handling threads 230 spawned by the population management thread 210 may be configured, for example in a configuration file (not shown) associated with the enterprise integration application 108. In an embodiment, a single management thread may combine the functionality provided by the population management thread 210 and the statistics management thread 212.

At block 308, statistics and/or operational metrics of the interface threads 220 and of the handling threads 230 are monitored and captured by the statistics management thread 212. The statistics are related to the performance and loading of the interface threads 220 and the handling threads 230 and may include timestamp information and date information.

At block 312, the interface thread 220 retrieves a service request from the message queue 214, for example a service request sent by the front end application 102, 104, 106 to a messaging service that the messaging service then enqueues on the message queue 214. At block 316, the handling thread 230 receives the service request from the interface thread 220 and processes the service request. The handling thread 230 processes the service request asynchronously with respect to the interface thread 220 that delivered the service request to the handling thread 230. More particularly, after the interface thread 220 delivers the service request to the handling thread 230, the interface thread 220 does not wait for the handling thread 230 to process the service request but proceeds to wait on the message queue 214 and retrieves another service request from the message queue 214, if a service request is waiting on the message queue 214. The handling thread 230 may act on the service request by accessing one or more of the back end databases 120, 122, 124 using any of a variety of interfaces to the backend databases 120, 122, 124 including, but not limited to, java messaging service (JMS), common object request broker architecture (CORBA), message queue, a database manager application, and other. The handling thread 230 may also act on the service request by interacting with one or more back end computer systems or other computer systems. The handling thread 230 may return a reply or result to the requesting front end application 102, 104, 106 through the interface thread 220, through the message queue 214, or directly. The handling thread 230 may return the reply through a different interface thread 220 than the interface thread that delivered the service request to the handling thread 230. For example, the first interface thread 220a may remove the service request from the message queue 214 and deliver it to the third handling thread 230c, and the third handling thread may return a result of the transaction to the first front end application 102 via the second interface thread 220b placing the result and/or reply on the message queue 214 or by directly returning the result and/or reply to the first front end application 102.

At block 320, the population management thread 210 communicates with the statistics management thread 212 and adjusts the numbers of interface threads 220 and handling threads 230 based on the statistics. The population management thread 210 may also adjust the numbers of interface threads 220 and handling threads based on a control input requesting more or less overall capacity. The method 300 returns to block 308 and continues to loop through blocks 308, 312, 316, and 320 indefinitely, until the business logic module 110 is terminated.

Figure 4:
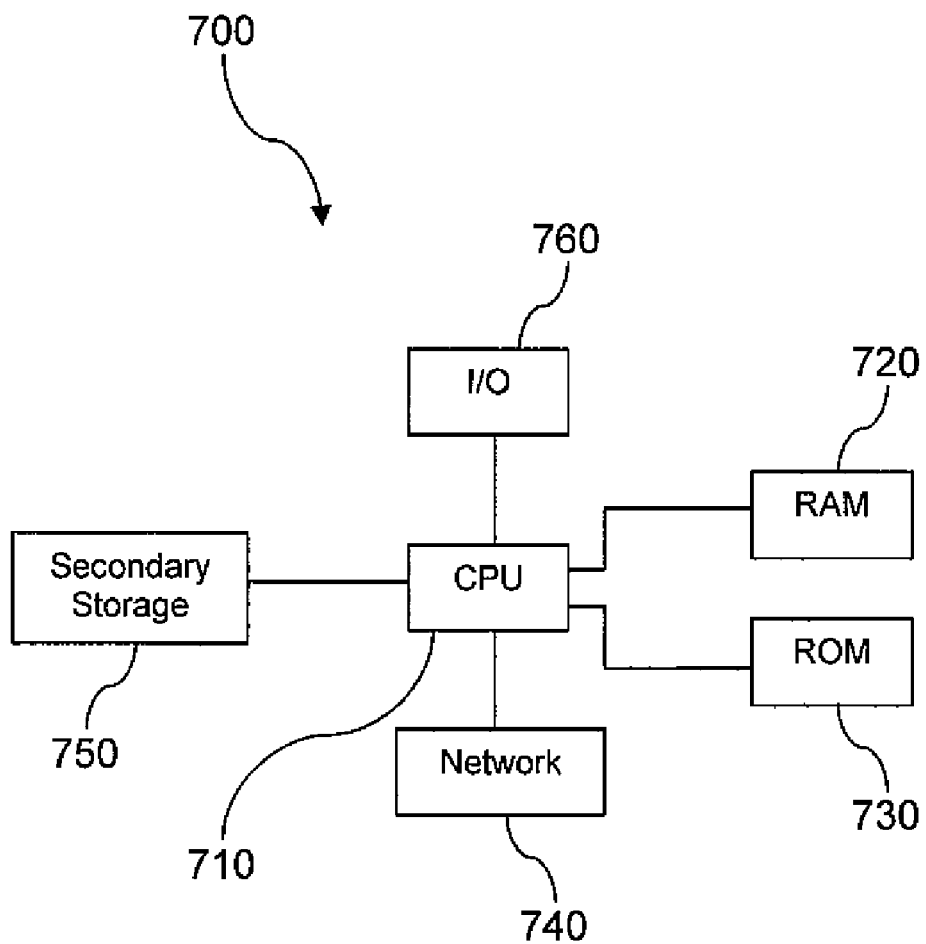
FIG. 4 illustrates an exemplary general purpose computer system suitable for implementing the several embodiments of the disclosure.

The system 100 described above may be implemented on one or more general-purpose computers with sufficient processing power, memory resources, and network throughput capability to handle the necessary workload placed upon it. FIG. 4 illustrates a typical, general-purpose computer system suitable for implementing one or more embodiments disclosed herein. The computer system 700 includes a processor 710 (which may be referred to as a central processor unit or CPU) that is in communication with memory devices including secondary storage 750, read only memory (ROM) 730, random access memory (RAM) 720, input/output (I/O) devices 760, and network connectivity devices 740. The processor may be implemented as one or more CPU chips.

The secondary storage 750 is typically comprised of one or more disk drives or tape drives and is used for non-volatile storage of data and as an over-flow data storage device if RAM 720 is not large enough to hold all working data. Secondary storage 750 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage. The RAM 720 is used to store volatile data and perhaps to store instructions. Access to both ROM 730 and RAM 720 is typically faster than to secondary storage 750.

I/O devices 760 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 740 may enable the processor 710 to communicate with an Internet or one or more intranets. With such a network connection, it is contemplated that the processor 710 might receive information from the network, or might output information to the network in the course of performing the above-described method steps. Such information, which is often represented as a sequence of instructions to be executed using processor 710, may be received from and outputted to the network, for example, in the form of a computer data signal embodied in a carrier wave Such information, which may include data or instructions to be executed using processor 710 for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 710 executes instructions, codes, computer programs, scripts which it accesses from hard disk, floppy disk, optical disk (these various disk based systems may all be considered secondary storage 750), ROM 730, RAM 720, or the network connectivity devices 740. While only one processor 740 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer system, comprising:
   a plurality of computers;
   a plurality of front-end applications that transmit a plurality of service requests, the plurality of front-end applications executing on at least one of the plurality of computers;
   a messaging service that receives the plurality of service requests from the front-end applications and places each service request on one of a plurality of queues based on a type of the plurality of service requests, the messaging service executing on at least one of the plurality of computers; and
   an enterprise integration application executing on at least one of the plurality of computers, comprising a plurality of business logic modules, each business logic module dedicated to acting on one type of the plurality of service requests from the plurality of front-end applications, each business logic module comprising:
      at least one interface thread that retrieves service requests of the one type from a queue of the plurality of queues associated with the one type of the plurality of service requests associated with a corresponding business logic module,
      at least one handling thread that acts on the service requests of the one type retrieved by the at least one interface thread from the queue, and
      at least one management thread that dynamically creates additional interface threads and additional handling threads as more interface threads and handling threads are needed by the corresponding business logic module based on processing load placed upon the corresponding business logic module by the plurality of front-end applications, wherein the management thread manages the number of handling threads to equal the number of service requests that are in-progress and manages the relationship between the number of handling threads and the number of interface threads so that the number of handling threads is greater than the number of interface threads, and wherein the at least one management thread comprises a counting thread that accumulates counts of the activity of the interface threads and the activity of the handling threads and a creator thread that manages the number of interface threads and handling threads based at least in part on the counts accumulated by the counting thread.

2. The computer system of claim 1, wherein the plurality of front-end applications comprise at least one of a customer care application, a customer payment application, and a sales application.

3. The computer system of claim 1, wherein at least some of the handling threads act on the service requests by, in part, requesting services from back-end systems selected from the group consisting of a billing system, a provisioning system, a network management system, and a telephone number portability system.

4. The computer system of claim 1, wherein the interface threads operate asynchronously with respect to the handling threads.

5. The computer system of claim 1, wherein the creator thread further receives a request for increased capacity support and wherein the creator thread manages the number of interface threads and handling threads based at least in part on the request for increased capacity support.

6. The computer system of claim 1, wherein the at least one interface thread further returns a response to the service requests of the one type to the messaging service and wherein the messaging service further returns the response to the plurality of front-end applications.

7. A method for managing a computer system service request, comprising:
  initializing a business logic module, the business logic module to act upon computer system service requests of one type from a plurality of front-end applications and initially comprising at least one interface thread, at least one handling thread, a population management thread, and a statistics management thread;
  monitoring, by the statistics management thread, a plurality of statistics of the business logic module associated with the at least one interface thread and the at least one handling thread, wherein the plurality of statistics comprise a processing load placed upon the at least one interface thread and the at least one handling thread of the business logic module by the plurality of front end applications;
  the at least one interface thread retrieving a computer system service request of the one type from a messaging service;
  the at least one handling thread acting on the computer system service request of the one type retrieved by the at least one interface thread from the messaging service; and
  dynamically controlling, by the population management thread, the numbers of interface threads and handling threads based on the monitoring of the plurality of statistics, wherein controlling the number of interface threads and handling threads comprises destroying interface threads and handling threads based on utilization of the at least one interface thread and the at least one handling thread.

8. The method of claim 1, wherein the number of interface threads initially is between one and six.

9. The method of claim 7, wherein the plurality of statistics include time and date stamps associated with the at least one interface thread and the at least one handling thread.

10. The method of claim 7, wherein the at least one interface thread retrieves the computer system service request from a WebSphere message queue and wherein the at least one interface thread, while being initialized, connects to the message queue and then opens the message queue.

11. The method of claim 7, wherein the number of interface threads is less than the number of handling threads.

12. The method of claim 7, wherein the at least one handling thread acts on the computer system service request by accessing back-end applications.

13. A system for executing a computer service request, comprising:
  a computer system; and
  a business logic module executing on the computer system and dedicated to processing one type of service request, wherein the business logic module comprises:
    at least one handling thread to process a plurality of service requests of the one type from a plurality of front-end applications, at least in part, by communicating with back-end computer systems;
    at least one interface thread to receive the plurality of service requests of the one type from the plurality of front-end applications and provide them asynchronously to the at least one handling thread;
    a statistics management thread to monitor a plurality of statistics of the business logic module, wherein the plurality of statistics comprise a processing load placed upon the at least one interface thread and the at least one handling thread, and wherein the plurality of statistics further comprises the utilization of the at least one interface thread and the at least one handling thread of the business logic module by the plurality of front-end applications; and
    a population management thread to dynamically control the number of interface threads and handling threads based on the monitoring of the plurality of statistics, wherein controlling the number of threads further comprises creating and destroying interface threads and handling threads based on the utilization of the at least one interface thread and the at least one handling thread of the business logic module by the plurality of front-end applications.

14. The system of claim 13, wherein the number of handling threads is equal to or greater than the number of interface threads.

15. The system of claim 13, wherein the statistics management thread tracks the utilization based at least in part on time and date stamps associated with the at least one interface thread and the at least one handling thread.

16. The system of claim 13, wherein the at least one interface thread created by the population management thread, the at least one handling thread created by the population management thread, and the statistics management thread associated with the population management thread are dedicated to handling a single type of computer service request.

17. The system of claim 13, further including an at least one back-end interface thread for accessing back-end systems based on the plurality of service requests in response to the at least one handling thread, wherein the statistics management thread is further configured to track the utilization of the at least one back-end interface thread, and wherein the population management thread is further configured to dynamically create and destroy the at least one back-end interface thread based on the utilization of the at least one interface thread, the at least one handling thread, and the at least one back-end interface thread.

18. The system of claim 13, wherein the at least one handling thread communicates with the back-end computer systems using one or more of a messaging service, a database manager, and an object-based remote procedure call system.

19. The system of claim 13, wherein the population management thread adjusts the numbers of interface threads and handling threads, at least in part, in response to a diurnal loading cycle.

* * * * *